US008597532B2

(12) United States Patent
Jaffrennou et al.

(10) Patent No.: US 8,597,532 B2
(45) Date of Patent: Dec. 3, 2013

(54) SIZING COMPOSITION FOR MINERAL WOOL COMPRISING A REDUCING SUGAR AND AN INORGANIC ACID METAL SALT, AND INSULATING PRODUCTS OBTAINED

(75) Inventors: Boris Jaffrennou, Paris (FR); Edouard Obert, Coye-la-Foret (FR); Olivier Pons Y Moll, Agnetz (FR); Stéphane Lohou, Paris (FR)

(73) Assignee: Saint-Gobain Isover, Courbevoie (FR)

( * ) Notice: Subject to any disclaimer, the term of this patent is extended or adjusted under 35 U.S.C. 154(b) by 8 days.

(21) Appl. No.: 13/320,868

(22) PCT Filed: Oct. 13, 2010

(86) PCT No.: PCT/FR2010/052164
§ 371 (c)(1), (2), (4) Date: Dec. 2, 2011

(87) PCT Pub. No.: WO2011/045531
PCT Pub. Date: Apr. 21, 2011

(65) Prior Publication Data

US 2012/0085962 A1 Apr. 12, 2012

(30) Foreign Application Priority Data

Oct. 13, 2009 (FR) ..................................... 09 57144

(51) Int. Cl.

| | |
|---|---|
| ***C09J 103/02*** | (2006.01) |
| ***C03C 25/14*** | (2006.01) |
| ***C03C 25/24*** | (2006.01) |
| ***C03C 25/26*** | (2006.01) |
| ***D04H 1/58*** | (2012.01) |
| ***D04H 1/64*** | (2012.01) |
| ***D06M 13/10*** | (2006.01) |
| ***E04B 1/74*** | (2006.01) |

(52) U.S. Cl.
USPC .................... 252/62; 106/205.7; 106/205.72; 106/205.8; 106/205.9; 106/217.7; 106/217.8; 106/217.9

(58) Field of Classification Search
USPC ........ 106/217.9, 205.7, 205.72, 205.8, 205.9, 106/217.7, 217.8; 252/62
See application file for complete search history.

(56) References Cited

U.S. PATENT DOCUMENTS

| | | | | |
|---|---|---|---|---|
| 2,544,714 | A | | 3/1951 | Moore |
| 2,657,163 | A | | 10/1953 | Ericks |
| 4,369,173 | A | | 1/1983 | Causland et al. |
| 4,761,184 | A | * | 8/1988 | Markessini ................ 106/217.6 |
| 5,318,990 | A | | 6/1994 | Strauss |
| 5,340,868 | A | | 8/1994 | Strauss et al. |
| 5,661,213 | A | | 8/1997 | Arkens et al. |
| 5,895,804 | A | | 4/1999 | Lee et al. |
| 5,932,689 | A | | 8/1999 | Arkens et al. |
| 5,977,232 | A | | 11/1999 | Arkens et al. |
| 6,071,994 | A | | 6/2000 | Hummerich et al. |
| 6,099,773 | A | | 8/2000 | Reck et al. |
| 6,146,746 | A | | 11/2000 | Reck et al. |
| 6,299,936 | B1 | | 10/2001 | Reck et al. |
| 6,331,350 | B1 | | 12/2001 | Taylor et al. |
| 2002/0188055 | A1 | | 12/2002 | Chen et al. |
| 2003/0008978 | A1 | | 1/2003 | Chen et al. |
| 2004/0002567 | A1 | | 1/2004 | Chen et al. |
| 2005/0214519 | A1 | | 9/2005 | Clements |
| 2005/0215153 | A1 | | 9/2005 | Cossement et al. |
| 2010/0282996 | A1 | * | 11/2010 | Jaffrennou et al. .......... 252/8.83 |

FOREIGN PATENT DOCUMENTS

| | | | | |
|---|---|---|---|---|
| DE | 42 22 444 | | | 1/1994 |
| DE | 102004011231 | | | 8/2005 |
| EP | 1 382 642 | | | 1/2004 |
| EP | 2 223 941 | | | 9/2010 |
| FR | 2 576 603 | | | 8/1986 |
| FR | 2924719 | A1 | * | 6/2009 |
| GB | 191201937 | | | 1/1913 |
| GB | 116 620 | | | 6/1918 |
| GB | 421 456 | | | 12/1934 |
| WO | WO 96/26164 | | | 8/1996 |
| WO | WO 01/96254 | | | 12/2001 |
| WO | WO 2007/014236 | | | 2/2007 |
| WO | WO 2008/089850 | | | 7/2008 |
| WO | WO 2009/019232 | | | 2/2009 |
| WO | WO 2009/019235 | | | 2/2009 |
| WO | WO 2009/080938 | | | 7/2009 |

OTHER PUBLICATIONS

International Search Report as issued for International Application No. PCT/FR2010/052164, dated Jan. 14, 2011.

* cited by examiner

*Primary Examiner* — Anthony J Green

(74) *Attorney, Agent, or Firm* — Pillsbury Winthrop Shaw Pittman LLP

(57) ABSTRACT

A sizing composition for insulating products based on mineral wool, in particular of glass or of rock, includes at least one reducing sugar, and at least one inorganic acid metal salt chosen from inorganic acid alkali metal, alkaline earth metal, transition metal or poor metal salts. Furthermore, insulating products based on mineral fibers obtained and their process of manufacture are presented.

21 Claims, 1 Drawing Sheet

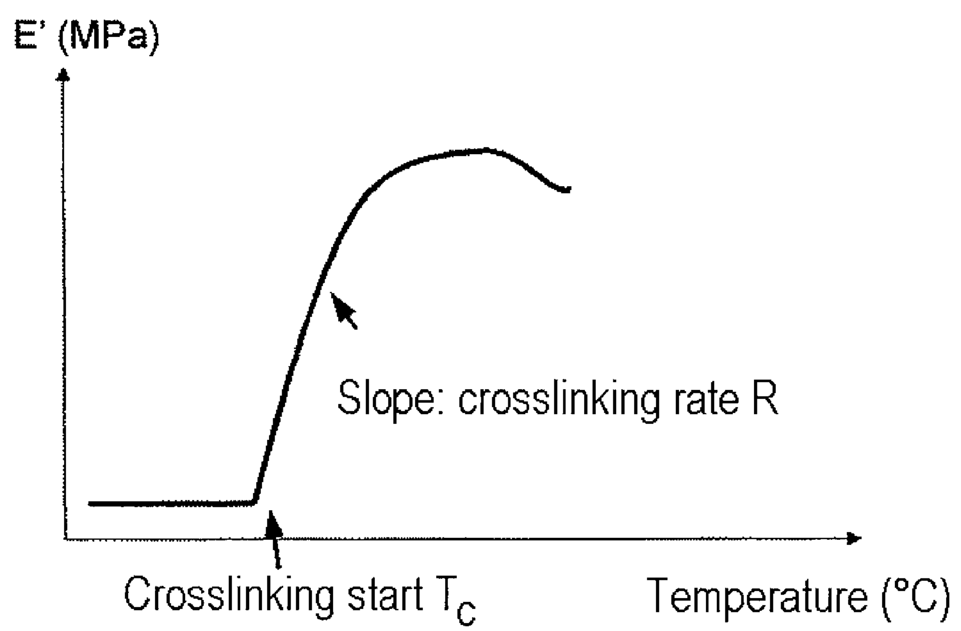
E' (MPa)
Slope: crosslinking rate R
Crosslinking start $T_C$
Temperature (°C)

SIZING COMPOSITION FOR MINERAL WOOL COMPRISING A REDUCING SUGAR AND AN INORGANIC ACID METAL SALT, AND INSULATING PRODUCTS OBTAINED

CROSS-REFERENCE TO RELATED APPLICATIONS

This application is the U.S. National Stage of PCT/FR2010/052164, filed Oct. 13, 2010, which in turn claims priority to French Application No. 0957144, filed Oct. 13, 2009. The content of both applications are incorporated herein by reference in their entirety.

The present invention relates to the field of thermal and/or acoustic insulating products based on mineral wool, in particular of glass or of rock, and on a formaldehyde-free binder.

The invention more particularly relates to a sizing composition capable of crosslinking to form said binder, which includes at least one reducing sugar and at least one inorganic acid metal salt, to the process for the manufacture of thermal and/or acoustic insulating products and to the insulating products which result therefrom.

The manufacture of insulating products based on mineral wool generally comprises a stage of manufacture of the wool itself, which can be carried out by various processes, for example according to the known technique of fiberizing by internal or external centrifugation.

Internal centrifugation consists in introducing the molten material (generally glass or a rock) into a centrifugal device comprising a multitude of small orifices, the material being projected toward the peripheral wall of the device under the action of the centrifugal force and escaping therefrom in the form of filaments. On leaving the centrifugal device, the filaments are drawn and carried toward a receiving member by a gas stream having a high temperature and a high speed, in order to form a web of fibers (or mineral wool).

External centrifugation consists, for its part, in pouring out the molten material at the external peripheral surface of rotating members, known as rotors, from where the melt is ejected under the action of the centrifugal force. Means for drawing by gas stream and for collecting on a receiving member are also provided.

In order to provide for the assembly of the fibers together and to make it possible for the web to have cohesion, a sizing composition comprising a thermosetting resin is projected onto the fibers, on the route between the outlet of the centrifugal device and the receiving member. The web of fibers coated with the size is subjected to a heat treatment, at a temperature generally of greater than 100° C., in order to bring about the polycondensation of the resin and to thus obtain a thermal and/or acoustic insulating product having specific properties, in particular dimensional stability, tensile strength, thickness recovery after compression and homogeneous color.

The sizing composition to be projected onto the mineral wool is generally provided in the form of an aqueous solution including the thermosetting resin and additives, such as a catalyst for the crosslinking of the resin, an adhesion-promoting silane, a dust-preventing mineral oil, and the like. The sizing composition is generally applied to the fibers by spraying.

The properties of the sizing composition depend largely on the characteristics of the resin. From the viewpoint of the application, it is necessary for the sizing composition to exhibit good sprayability and to be able to be deposited at the surface of the fibers in order to efficiently bind them.

The resin has to be stable for a given period of time before being used to form the sizing composition, which composition is generally prepared at the time of use by mixing the resin and the additives mentioned above.

At the regulatory level, it is necessary for the resin to be regarded as non-polluting, that is to say for it to comprise—and for it to generate during the sizing stage or subsequently—as little as possible in the way of compounds which may be harmful to human health or to the environment.

The thermosetting resins most commonly used are phenolic resins belonging to the family of the resols. In addition to their good crosslinkability under the abovementioned thermal conditions, these resins are soluble in water, have a good affinity for mineral fibers, in particular glass fibers, and are relatively inexpensive.

These resols are obtained by condensation of phenol and formaldehyde, in the presence of a basic catalyst, in a formaldehyde/phenol molar ratio of greater than 1, so as to promote the reaction between the phenol and the formaldehyde and to reduce the level of residual phenol in the resin. The condensation reaction between the phenol and the formaldehyde is carried out while limiting the degree of condensation of the monomers, in order to avoid the formation of long, relatively water-insoluble, chains which reduce the dilutability. Consequently, the resin comprises a certain proportion of unreacted monomer, in particular formaldehyde, the presence of which is undesirable because of its known harmful effects.

For this reason, resol-based resins are generally treated with urea, which reacts with the free formaldehyde by trapping it in the form of nonvolatile urea-formaldehyde condensates. The presence of urea in the resin in addition brings a certain economic advantage as a result of its low cost because it is possible to introduce it in a relatively large amount without affecting the operating qualities of the resin, in particular without harming the mechanical properties of the final product, which significantly lowers the total cost of the resin.

Nevertheless, it has been observed that, under the temperature conditions to which the web is subjected in order to obtain crosslinking of the resin, the urea-formaldehyde condensates are not stable; they decompose with restoration of the formaldehyde and urea, in its turn at least partially decomposed to give ammonia, which are released into the atmosphere of the factory.

Regulations with regard to environmental protection, which are becoming more restrictive, are forcing manufacturers of insulating products to look for solutions which make it possible to further lower the levels of undesirable emissions, in particular of formaldehyde.

Solutions in which resols are replaced in sizing compositions are known.

A first solution is based on the use of a carboxylic acid polymer, in particular an acrylic acid polymer.

In U.S. Pat. No. 5,340,868, the size comprises a polycarboxylic polymer, a β-hydroxyamide and an at least trifunctional monomeric carboxylic acid.

Other sizing compositions have been provided which comprise a polycarboxylic polymer, a polyol and a catalyst, this catalyst being able to be a phosphorus-comprising compound (U.S. Pat. Nos. 5,318,990, 5,661,213, 6,331,350, US 2003/0008978), a fluoroborate (U.S. Pat. No. 5,977,232) or else a cyanamide, a dicyanamide or a cyanoguanidine (U.S. Pat. No. 5,932,689).

The sizing compositions based on a polycarboxylic polymer and on a polyol can additionally comprise a cationic, amphoteric or nonionic surfactant (US 2002/0188055), a coupling agent of silane type (US 2004/0002567) or a dextrin as cobinder (US 2005/0215153).

A description has also been given of sizing compositions comprising an alkanolamine including at least two hydroxyl groups and a polycarboxylic polymer (U.S. Pat. Nos. 6,071,994, 6,099,773, 6,146,746) in combination with a copolymer (U.S. Pat. No. 6,299,936).

A second solution in which resols are replaced is based on the combination of a saccharide and a polycarboxylic acid.

In U.S. Pat. No. 5,895,804, a description is given of an adhesive composition based on heat-crosslinkable polysaccharides which can be used as size for mineral wool. The combination includes a polycarboxylic polymer having at least two carboxylic acid functional groups and a molecular weight at least equal to 1000, and a polysaccharide having a molecular weight at least equal to 10 000.

In WO 2009/080938, the sizing composition comprises a monosaccharide and/or a polysaccharide and an organic polycarboxylic acid with a molar mass of less than 1000.

A formaldehyde-free aqueous sizing composition which comprises a Maillard reaction product, in particular combining a reducing sugar, a carboxylic acid and aqueous ammonia (WO 2007/014236), is also known. In WO 2009/019232 and WO 2009/019235, the proposal is made to substitute, for the carboxylic acid, an acid precursor derived from an inorganic salt, in particular an ammonium salt, which exhibits the additional advantage of being able to replace all or part of the aqueous ammonia.

The latter sizing compositions nevertheless comprise nitrogen-including compounds which are capable of decomposing, in particular to give ammonia, during the heat treatment employed in order for the mineral fibers to be able to be bonded to one another and to form the final insulating product.

An aim of the present invention is to provide a sizing composition for insulating products based on mineral wool, in particular of glass or of rock, which is devoid of formaldehyde and other nitrogenous compounds.

In order to achieve this aim, the present invention provides a sizing composition which comprises:

- at least reducing sugar, and
- at least one inorganic acid metal salt chosen from inorganic acid alkali metal, alkaline earth metal, transition metal or poor metal salts.

The reducing sugar in accordance with the present invention is a monosaccharide, an oligosaccharide, a polysaccharide or a mixture of these compounds.

Mention may be made, as example of monosaccharide, of glucose, galactose, mannose and fructose.

The term "oligosaccharide" is understood to mean a saccharide including from 2 to 10 saccharide units, preferably at most 5.

Mention may be made, as example of oligosaccharide, of lactose, maltose, isomaltose and cellobiose.

The polysaccharides in accordance with the invention are chosen from the polysaccharides having a number-average molar mass of less 100 000, preferably of less than 50 000 and advantageously of less than 10 000.

Mention may be made, as example of preferred polysaccharide, of dextrins. Dextrins are compounds corresponding to the general formula $(C_6H_{10}O_5)_n$ obtained by partial hydrolysis of starch. The processes for the preparation of dextrins are known. For example, dextrins can be prepared by heating or by drying to dryness a starch, generally in the presence of an acid catalyst, which results in the constituent amylose and amylopectin molecules of said starch being ruptured to give products of lower molar mass. Dextrins can also be obtained by treating the starch enzymatically with one or more amylases, in particular microbial amylases, capable of hydrolyzing the bonds of the starch. The nature of the treatment (chemical or enzymatic) and the hydrolysis conditions have a direct effect on the average molar mass and the distribution of the molar masses of the dextrin.

The dextrins according to the present invention exhibit a dextrose equivalent (DE) of greater than or equal to 5, preferably of greater than or equal to 15.

Conventionally, the dextrose equivalent DE is defined by the following relationship:

$$DE = 100 \times \left( \frac{\text{number of glycoside bonds cleaved}}{\text{number of glycoside bonds in the starting starch}} \right)$$

The dextrins in accordance with the invention can be obtained from starch or starch derivatives of varied plant origin, for example resulting from tubers, such as potato, cassava, maranta and sweet potato, resulting from seeds, such as wheat, corn, rye, rice, barley, millet, oats and sorghum, resulting from fruit, such as horse chestnut, sweet chestnut and hazelnut, or resulting from leguminous plants, such as peas and beans.

Preferably, the reducing sugar is chosen from glucose, polysaccharides composed predominantly (to more than 50% by weight) of glucose units and mixtures of these compounds.

The inorganic acid metal salt acts as inorganic acid precursor, which acid reacts with the reducing sugar under the effect of the heat to form a polymeric network constituting the final binder. The polymeric network thus formed makes it possible to establish bonds at the junction points of the fibers in the mineral wool.

As already indicated, the inorganic acid metal salt is chosen from inorganic acid alkali metal, alkaline earth metal, transition metal or poor metal salts. Preferably, it is a sodium, magnesium, iron, cobalt, nickel, copper, zinc or aluminum salt, advantageously an aluminum or copper salt.

The inorganic acid metal salt is advantageously chosen from sulfates, chlorides, nitrates, phosphates and carbonates and better still from sulfates and chlorides.

Preference is given to aluminum sulfate, copper sulfate, potassium aluminum sulfate (or potassium alum), iron sulfate, zinc sulfate and aluminum chloride, in particular to aluminum sulfate and copper sulfate.

In the sizing composition, the inorganic acid metal salt represents from 1 to 30% by weight of the total weight of the mixture composed of the reducing sugar and the inorganic acid metal salt, preferably from 3 to 20% and advantageously from 5 to 15%.

The sizing composition in accordance with the invention can also comprise the conventional additives below in the following proportions, calculated on the basis of 100 parts by weight of reducing sugar and of inorganic acid metal salt:

- from 0 to 2 parts of silane, in particular an aminosilane,
- from 0 to 20 parts of oil, preferably from 4 to 15 parts,
- from 0 to 20 parts of glycerol, preferably from 0 to 10 parts,
- from 0 to 5 parts of a silicone,
- from 0 to 30 parts of an "extender".

The role of the additives is known and is briefly restated: the silane is an agent for coupling between the fibers and the binder, and also acts as antiaging agent; the oils are dust-preventing and hydrophobic agents; the glycerol acts as plasticizer and makes it possible to prevent pregelling of the sizing composition; the silicone is a hydrophobic agent having the role of reducing the absorption of water by the insulating product; the "extender" is an organic or inorganic filler, soluble or dispersible in the aqueous sizing composition, which makes it possible in particular to reduce the cost of the sizing composition.

The sizing composition exhibits a pH which varies to a large extent according to the nature of the inorganic acid metal salt used, generally from 2 to 10, advantageously acidic, in particular of less than or equal to 5.

The sizing composition is intended to be applied to mineral fibers, in particular glass or rock fibers.

Conventionally, the sizing composition is projected onto the mineral fibers at the outlet of the centrifugal device and before they are collected on the receiving member in the form of a web of fibers which is subsequently treated at a temperature which makes possible the crosslinking of the size and the formation of an infusible binder. The crosslinking of the size according to the invention takes place at a temperature of the order of from 100 to 200° C., generally at a temperature comparable to that of a conventional formaldehyde-phenol resin, in particular of greater than or equal to 110° C., preferably of less than or equal to 170° C.

The acoustic and/or thermal insulating products obtained from these sized fibers also constitute a subject matter of the present invention.

These products are generally provided in the form of a mat or felt of mineral wool, of glass or of rock, or of a veil of mineral fibers, also of glass or of rock, intended in particular to form a surface coating on said mat or said felt.

The following examples make it possible to illustrate the invention without, however, limiting it.

BRIEF DESCRIPTION OF THE DRAWINGS

FIG. 1 shows the variation in the modulus of elasticity E' as a function of temperature in accordance with an embodiment.

In these examples, the following are measured:

- the crosslinking start temperature ($T_C$) and the crosslinking rate (R) by the Dynamic Mechanical Analysis (DMA) method, which makes it possible to characterize the viscoelastic behavior of a polymeric material. The procedure is as follows: a sample of Whatman paper is impregnated with the sizing composition (content of organic solids of the order of 40%) and is then fixed horizontally between two jaws. An oscillating component equipped with a device for measuring the stress as a function of the strain applied is positioned on the upper face of the sample. The device makes it possible to calculate the modulus of elasticity E'. The sample is heated to a temperature varying from 20 to 250° C. at the rate of 4° C./min. The curve of variation in the modulus of elasticity E' (in MPa) as a function of the temperature (in ° C.) is plotted from the measurements, the general appearance of the curve being given in FIG. 1. The values corresponding to the crosslinking start temperature ($T_C$), in ° C., and the slope corresponding to the crosslinking rate (R), in MPa/° C., are determined on the curve.
- the viscosity, expressed in mPa·s, using a rheometer of plate/plate rotational type with shearing of 100 $s^{-1}$ at 25° C. The sample has a solids content of 30% by weight.
- the contact angle of the sizing composition on a glass substrate.
- the tensile strength according to the standard ASTM C 686-71T on a sample cut out by stamping from the insulating product. The sample has the shape of a torus with a length of 122 mm, a width of 46 mm, a radius of curvature of the cut-out of the outer edge equal to 38 mm and a radius of curvature of the cut-out of the inner edge equal to 12.5 mm.

The sample is positioned between two cylindrical mandrels of a test machine, one of which is movable and is moved at a constant rate. The breaking force F (in gram-force) of the sample is measured and the tensile strength TS, defined by the ratio of the breaking force F to the weight of the sample, is calculated.

The tensile strength is measured after manufacture (initial tensile strength) and after accelerated aging in an autoclave at a temperature of 105° C. under 100% relative humidity for 15 minutes (TS 15).

- the initial thickness of the insulating product and the thickness after compressing for 1 hour, 24 hours and 30 days with a degree of compression (defined as being the ratio of the nominal thickness to the thickness under compression) equal to 4.8/1. The thickness measurements make it possible to evaluate the good dimensional behavior of the product.
- the thermal conductivity coefficient λ according to the standard EN 13162, expressed in W/(m×° K).

EXAMPLES 1 TO 8

Sizing compositions are prepared which comprise the constituents appearing in Table 1, expressed as parts by weight.

The sizing compositions are prepared by successively introducing, into a vessel containing water, the reducing sugar and the inorganic acid metal salt with vigorous stirring until the constituents have completely dissolved.

The following dextrins are used as reducing sugar:

- glucose syrup 74/968®, which has a glucose content by weight of greater than 95% and exhibits a dextrose equivalent DE equal to 99 (sold by Roquette Frères; solids content: 75%);
- Flolys® B6080S, which has a weight-average molar mass of 1520 and a dextrose equivalent DE of 62 (sold under the reference by Roquette Frères; solids content: 81%).

The properties of the sizing compositions which appear in table 1 are evaluated in comparison with a conventional sizing composition including a formaldehyde-phenol resin and urea (Reference) prepared in accordance with example 2, test 1, of WO 01/96254 A1 and with a composition comprising only the reducing sugar (C1).

The sizing compositions of examples 1 to 8 exhibit a crosslinking start temperature ($T_C$) which is lower than that of the Reference. These compositions also exhibit a crosslinking rate (R) close to that of the Reference, and even significantly higher (examples 2 and 3).

The sizing compositions of examples 1 to 8 additionally have a low viscosity, lower than that of the Reference at an identical solids content, which allows good application to the mineral fibers, in particular by spraying.

The sizing compositions according to the invention also exhibit a low contact angle on a glass substrate, which denotes a good ability to wet the fibers.

EXAMPLE 9

This example illustrates the manufacture of insulating products on an industrial line.

A sizing composition is prepared which comprises the following constituents (as parts by weight):

| | |
|---|---|
| glucose syrup 74/968 ® | 92.5 |
| aluminum sulfate | 7.5 |
| γ-aminopropyltriethoxysilane | 1.0 |
| mineral oil | 8.0 |
| silicone | 1.5 |

Glass wool is manufactured by the internal centrifugation technique in which the molten glass composition is converted into fibers by means of a tool, referred to as centrifuging disk, comprising a basket forming a chamber for receiving the molten composition and a peripheral band pierced by a multitude of orifices: the disk is rotated about its vertically positioned axis of symmetry, the composition is ejected through the orifices under the effect of the centrifugal force and the material escaping from the orifices is drawn into fibers with the assistance of a drawing gas stream.

Conventionally, a size spraying ring is positioned beneath the fiberizing disk so as to uniformly distribute the sizing composition over the glass wool which has just been formed.

The mineral wool, thus sized, is collected on a belt conveyor with a width of 2.4 m equipped with internal extraction boxes which hold the mineral wool in the form of a web at the surface of the conveyor. The web passes continuously through an oven maintained at 270° C., where the constituents of the size polymerize to form a binder. The final insulating product has a density of 17.5 kg/m$^3$.

During the manufacture of the insulating product, the nitrogen emissions in the chimney remained at a minimal level.

The insulating product exhibits the following properties:

| | |
|---|---|
| Tensile strength (gf/g) | |
| before aging | 206 |
| after aging | 150 |
| loss (%) | 27 |
| Thickness (mm) | |
| after 1 hour | 83.5 |
| after 24 hours | 81.6 |
| after 30 days | 79.5 |
| Loss on ignition (%) | 6.0 |
| λ (W/(m × ° K)) | 0.035 |

The insulating product is stable in thickness and retains mechanical cohesion after aging. This product can be used in particular in applications where the mechanical stress is relatively unimportant, for example for the insulation of unoccupied attics.

EXAMPLES 10 TO 14

These examples illustrate the manufacture of insulating products in an industrial plant employing different inorganic acid metal salts.

The procedure is carried out under the conditions of example 9, modified in that, in the sizing compositions, the glucose syrup 74/968® and the inorganic acid metal salts are present in the proportions shown in table 2 (as parts by weight).

The properties of the insulating products obtained are collated in table 2.

TABLE 1

| Example | 1 | 2 | 3 | 4 | 5 | 6 | 7 | 8 | C1 | Reference |
|---|---|---|---|---|---|---|---|---|---|---|
| Sizing Composition | | | | | | | | | | |
| Reducing sugar | | | | | | | | | | |
| Glucose syrup 74/968 ® | 95 | 90 | — | 92.5 | 85 | 85 | 92.5 | 85 | 100 | — |
| Flolys ® BS6080S | — | — | 85 | — | — | — | — | — | — | — |
| Inorganic acid metal salt | | | | | | | | | | |
| Aluminum sulfate | 5 | 10 | 15 | — | — | — | — | — | — | — |
| Copper sulfate | — | — | — | 7.5 | 15 | — | — | — | — | — |
| Potassium alum | — | — | — | — | — | 15 | — | — | — | — |
| Aluminum chloride | — | — | — | — | — | — | 7.5 | 15 | — | — |
| Properties | | | | | | | | | | |
| Crosslinking start temp. $T_C$ (° C.) | 122 | 115 | 102 | 126 | 119 | 121 | 116 | 110 | 234 | 151 |
| Crosslinking rate R (MPa/° C.) | 128 | 293 | 345 | 100 | 150 | 163 | 141 | 129 | 16 | 161 |
| Viscosity at 25° C. (mPa · s)[1] | 6.4 | 6.5 | 7.0 | 5.8 | 6.1 | 6.4 | 6.3 | 6.7 | 6.1 | 8.0 |
| Contact angle (°)[2] | 28 | 16 | 30 | 32 | 31 | 28 | 32 | 33 | 27 | 10.0 |
| pH | 2.9 | 2.8 | 2.8 | 3.2 | 3.1 | 2.8 | 2.4 | 2.2 | 3.6 | 6.0 |

(1)solution with a solids content of 30%
(2)solution with a solids content of 40%

TABLE 2

| Example | 10 | 11 | 12 | 13 | 14 |
|---|---|---|---|---|---|
| Sizing composition | | | | | |
| Glucose syrup 74/968 ® | 85 | 92.5 | 85 | 85 | 85 |
| Aluminum sulfate | 15 | — | — | — | — |
| Copper sulfate | — | 7.5 | 15 | — | — |
| Iron(II) sulfate | — | — | — | 15 | — |
| Zinc sulfate | — | — | — | — | 15 |
| Properties | | | | | |
| Tensile strength (gf/g) | | | | | |
| before aging | 192 | 188 | 224 | 144 | 167 |
| after aging | 168 | 238 | 241 | 159 | 174 |
| loss | 12.5% | −26.5% | −7.5% | −10.4% | −4.1% |
| Thickness (mm) | | | | | |
| 1 hour | 80.5 | 85.6 | 84.2 | 89.5 | 90.2 |
| 24 hours | 79.2 | 83.6 | 81.7 | 86.0 | 87.8 |
| 30 days | 76.3 | 81.5 | 78.6 | 84.6 | 87.9 |
| Loss on ignition (%) | 5.5 | 5.5 | 5.5 | 5.5 | 5.5 |
| λ (W/(m × ° K)) | 0.035 | 0.035 | 0.035 | 0.035 | 0.035 |

What is claimed is:

1. A sizing composition for insulating products based on mineral wool, the composition consisting of:
at least one reducing sugar,
at least one inorganic acid metal salt selected from the group consisting of inorganic acid alkali metal, alkaline earth metal, transition metal and poor metal salts,
one or more additives below in the following proportions, calculated on the basis of 100 parts by weight of reducing sugar and of inorganic acid metal salt:
from 0 to 2 parts of silane,
from 0 to 20 parts of oil,
from 0 to 20 parts of glycerol,
from 0 to 5 parts of a silicone,
from 0 to 30 parts of an extender, and
water,
wherein the inorganic acid metal salt represents from 1 to 30% by weight of the total weight of the mixture composed of the reducing sugar and the inorganic acid metal salt.

2. The composition as claimed in claim 1, wherein the reducing sugar is a monosaccharide, an oligosaccharide, a polysaccharide or a mixture thereof.

3. The composition as claimed in claim 2, wherein the reducing sugar is glucose, galactose, mannose, fructose, lactose, maltose, isomaltose, cellobiose or a dextrin.

4. The composition as claimed in claim 1, wherein the reducing sugar is selected from the group consisting of glucose, polysaccharides comprising more than 50% by weight of glucose units and mixtures thereof.

5. The composition as claimed in claim 1, wherein the inorganic acid metal salt is a sodium, magnesium, iron, cobalt, nickel, copper, zinc or aluminum salt.

6. The composition as claimed in claim 5, wherein the inorganic acid metal salt is selected from the group consisting of sulfates, chlorides, nitrates, phosphates and carbonates.

7. The composition as claimed in claim 5, wherein the inorganic acid metal salt is aluminum sulfate, copper sulfate, potassium aluminum sulfate (or potassium alum), iron sulfate, zinc sulfate and aluminum chloride.

8. The composition as claimed in claim 1, wherein the mineral wool is rock wool or glass wool.

9. The composition as claimed in claim 5, wherein the metal is aluminum or copper.

10. The composition as claimed in claim 6, wherein the inorganic acid metal salt is a sulfate or a chloride.

11. The composition as claimed in claim 7, wherein the inorganic acid metal salt is aluminum sulfate or copper sulfate.

12. The composition as claimed in claim 1, wherein the acid metal salt represents from 3 to 20% % by weight of the total weight of the mixture composed of the reducing sugar and the inorganic acid metal salt.

13. The composition as claimed in claim 12, wherein the acid metal salt represents from 5 to 15% % by weight of the total weight of the mixture composed of the reducing sugar and the inorganic acid metal salt.

14. The composition as claimed in claim 1, wherein the one or more additives comprise from 4 to 15 parts of oil.

15. The composition as claimed in claim 1, wherein the one or more additive comprise from 0 to 10 parts of glycerol.

16. An acoustic and/or thermal insulating product based on mineral wool sized with the sizing composition as claimed in claim 1.

17. The product as claimed in claim 16, wherein the mineral wool is glass wool or rock wool.

18. A veil of mineral fibers sized with the sizing composition as claimed in claim 1.

19. The veil as claimed in claim 18, wherein the mineral wool is glass wool or rock wool.

20. A process for the manufacture of an acoustic and/or thermal insulating product based on mineral wool or of a veil of mineral fibers, the method comprising:

projecting a sizing composition onto said wool or said fibers, and treating said wool or said fibers at a temperature which makes possible the crosslinking of the sizing composition, wherein the sizing composition comprises:

at least one reducing sugar, at least one inorganic acid metal salt selected from the group consisting of inorganic acid alkali metal, alkaline earth metal, transition metal and poor metal salts one or more additives below in the following proportions, calculated on the basis of 100 parts by weight of reducing sugar and of inorganic acid metal salt:

from 0 to 2 parts of silane,
from 0 to 20 parts of oil,
from 0 to 20 parts of glycerol,
from 0 to 5 parts of a silicone,
from 0 to 30 parts of an extender, and water, wherein the inorganic acid metal salt represents from 1 to 30% by weight of the total weight of the mixture composed of the reducing sugar and the inorganic acid metal salt.

21. A sizing composition for insulating products based on mineral wool, the composition consisting essentially of:

at least one reducing sugar, at least one inorganic acid metal salt selected from the group consisting of inorganic acid alkali metal, alkaline earth metal, transition metal and poor metal salts, one or more additives below in the following proportions, calculated on the basis of 100 parts by weight of reducing sugar and of inorganic acid metal salt:

from 0 to 2 parts of silane,
from 0 to 20 parts of oil,
from 0 to 20 parts of glycerol,
from 0 to 5 parts of a silicone,
from 0 to 30 parts of an extender, and water, wherein the inorganic acid metal salt represents from 1 to 30% by weight of the total weight of the mixture composed of the reducing sugar and the inorganic acid metal salt.

* * * * *